Sept. 30, 1958     D. W. KELBEL     2,853,890

TRANSMISSION

Filed Sept. 18, 1951     4 Sheets-Sheet 1

Inventor:
Donald W. Kelbel
By Frank C. Parker
Atty.

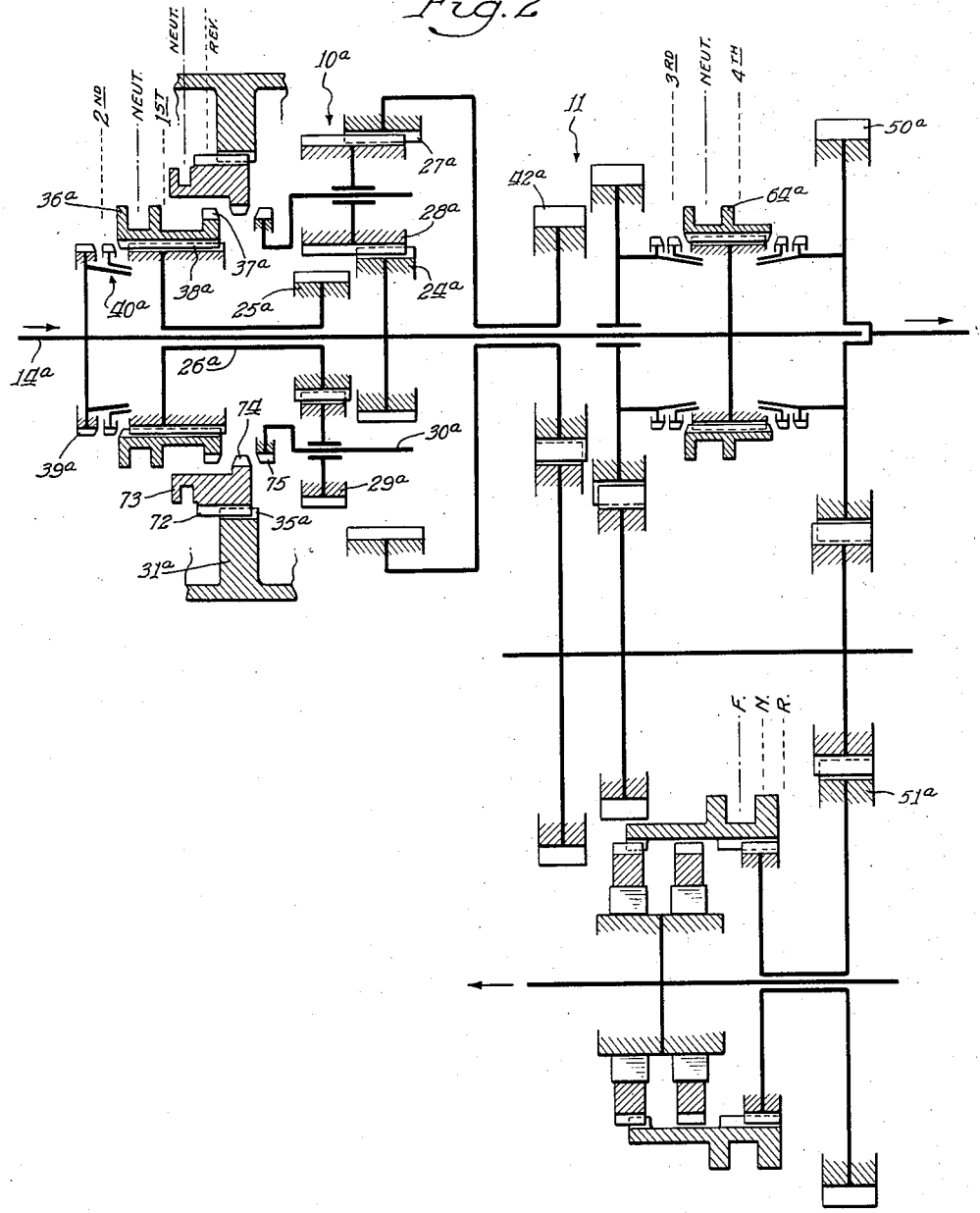

Sept. 30, 1958 D. W. KELBEL 2,853,890
TRANSMISSION
Filed Sept. 18, 1951 4 Sheets-Sheet 3
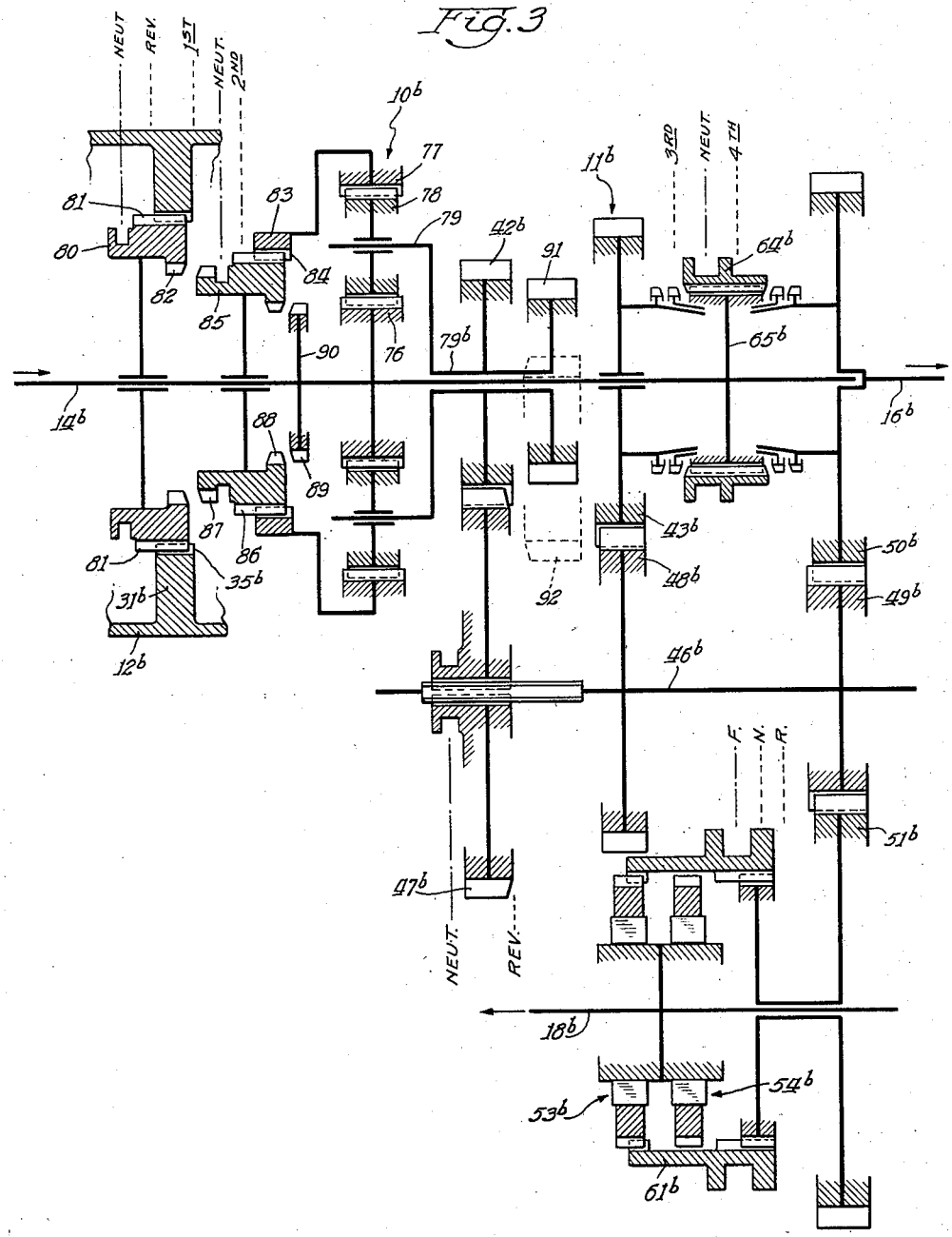
Inventor:
Donald W. Kelbel
By Frank C. Parker
Atty.

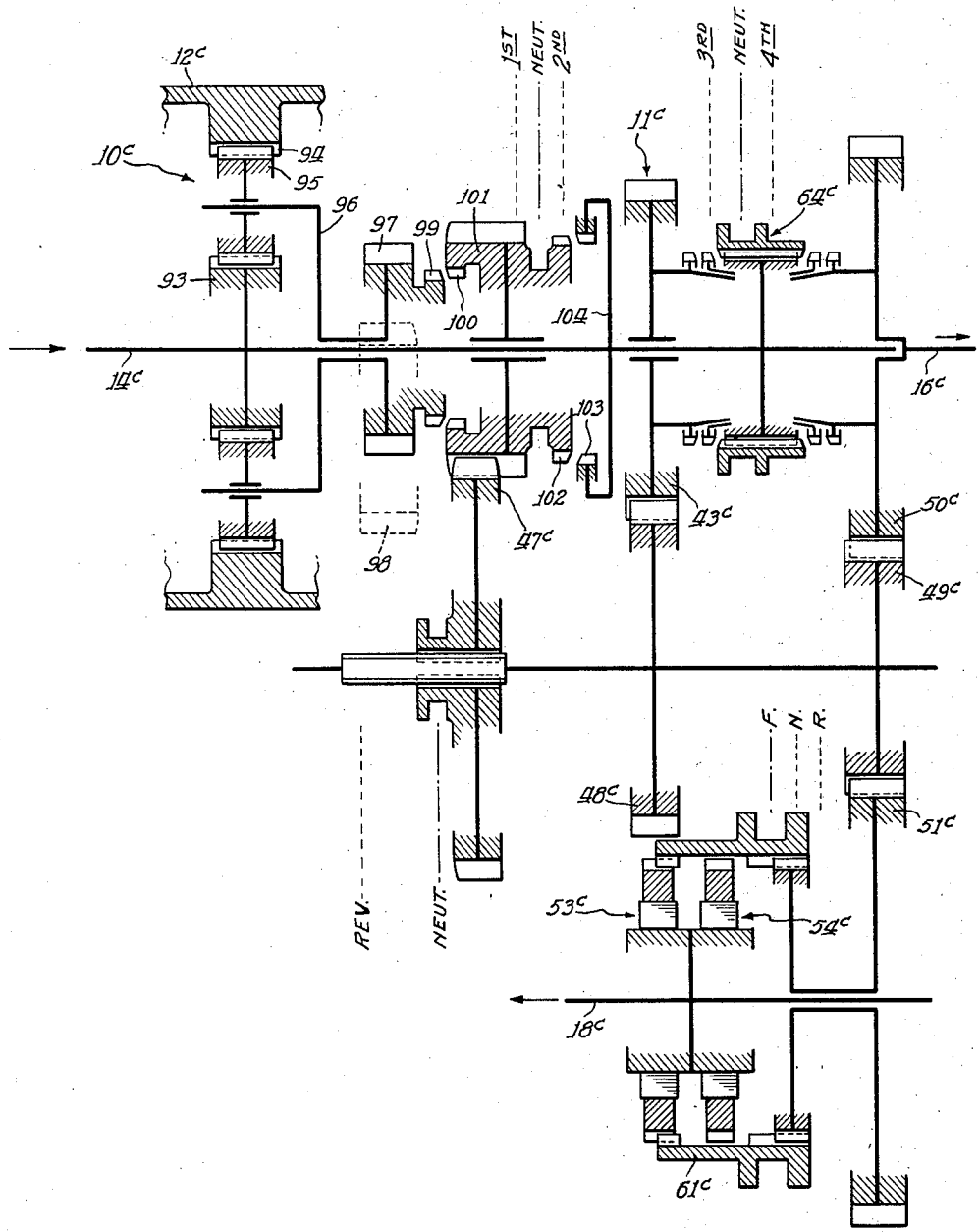

United States Patent Office 2,853,890
Patented Sept. 30, 1958

2,853,890
TRANSMISSION

Donald W. Kelbel, Muncie, Ind., assignor to The Borg-Warner Corporation, Chicago, Ill., a corporation of Illinois Application September 18, 1951, Serial No. 247,181

12 Claims. (Cl. 74—665)

The present invention relates to transmissions in general and more particularly to transmissions utilizing planetary gearing and countershaft gearing in combination for effecting a plurality of drives between the transmission input shaft and a pair of transmission output shafts connected respectively with the rear wheels and the front wheels of a vehicle with which the transmission is associated.

The principal object of the present invention is to provide a transmission utilizing a combination of planetary and countershaft gearing for effecting drives to both the front and rear wheels of the vehicle with which the transmission is associated, which transmission has the particular advantages of being light in weight and economical to manufacture.

One of the important features of the present invention is the provision of a pair of transmission output elements connectible respectively with the rear and front wheels of the vehicle, the connection between the output element associated with the rear wheels of the vehicle being a direct connection and the connection between the output element associated with the front wheels of the vehicle being a connection through either one of a pair of one-way engaging devices and the relative sizes of said output elements being such that upon a complete rotation of the output element connected to the rear wheels of the vehicle the other output element only rotates through a partial revolution. By means of the one-way engaging devices which permit the front wheels of the vehicle to overrun whenever a drive is transmitted to the rear wheels thereof, a drive is automatically completed to the front wheels of the vehicle upon any tendency of the rear wheels to slip or fail to gain the necessary traction in order to advance the vehicle. This construction is particularly advantageous in vehicles used in traversing rough terrain or when the vehicle is driven through sand, mud or snow, for example. As is well known, it is undesirable to have the front wheels drive so long as the rear wheels are able to obtain the necessary traction, but when the rear wheels of the vehicle slip it is then desirable that the front wheels automatically take over and become an added driving member, thereby greatly facilitating getting the vehicle out of mud, sand, etc., which is very difficult when only the rear wheels of the vehicle drive.

In all embodiments of the invention disclosed herein, the planetary gearing is effective in connection with a portion of the countershaft gearing to provide too low forward driving ratios through the transmission and the countershaft gearing alone is effective to provide the two higher forward speed drives through the transmission. In two embodiments of the invention the planetary gearing is also effective to provide a reverse drive through the transmission whereas in two other embodiments disclosed herein the countershaft gearing is utilized for effecting reverse drive through the transmission.

Numerous objects and advantages will become apparent from the following detailed description when read in conjunction with the accompanying drawings, wherein:

Figs. 2, 3 and 4 comprise schematic views of three modified forms of the invention.

Figure 1:
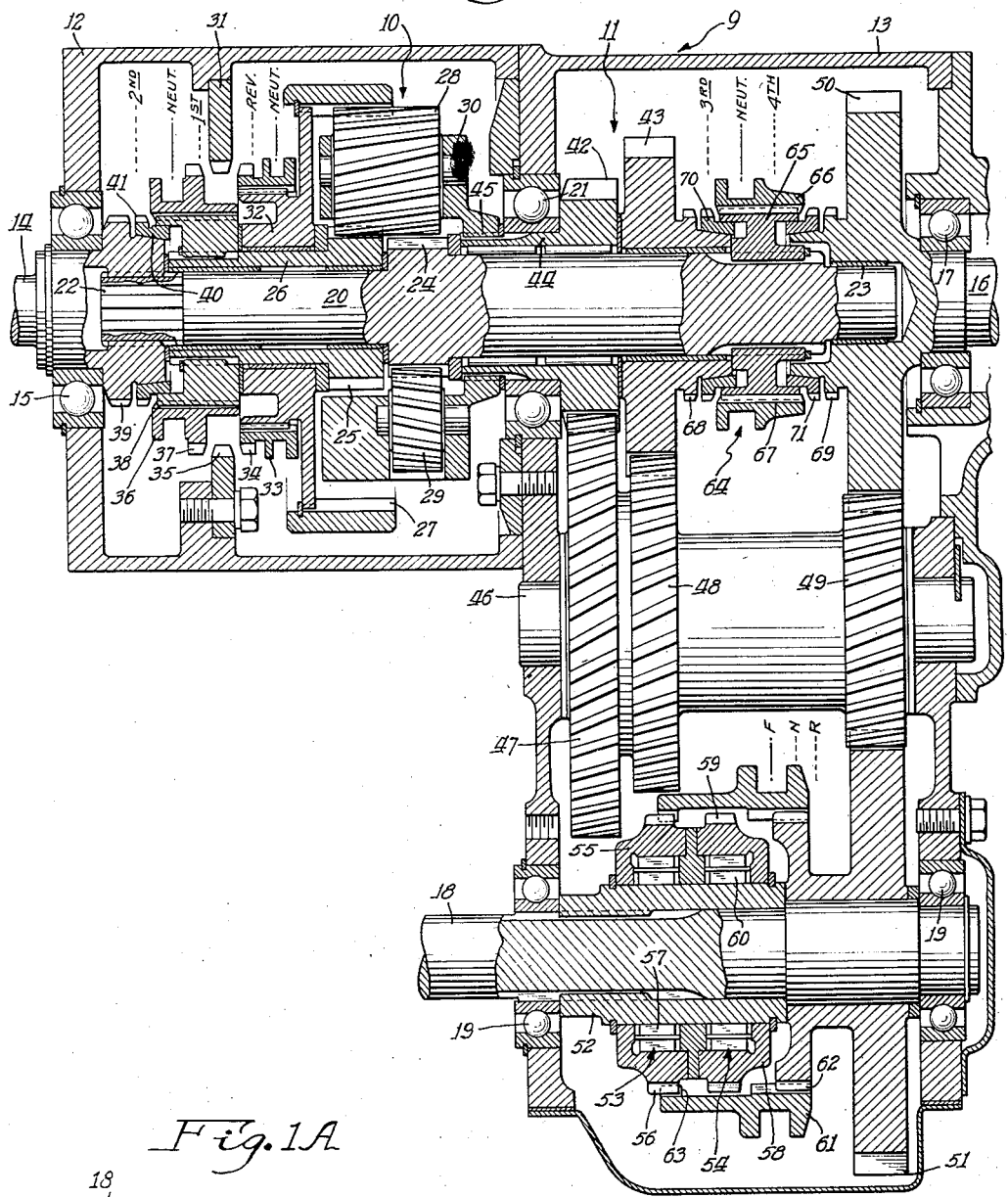
Fig. 1 is a side elevational view, shown partly in section, of one embodiment of the invention.
Figure 1A:
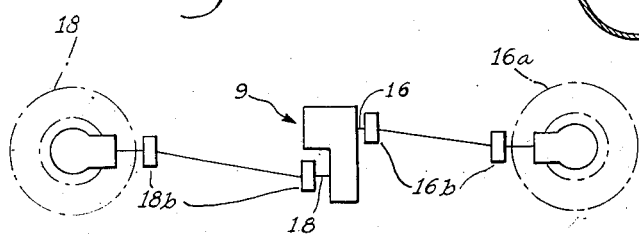
Fig. 1a is a schematic view illustrating the front and rear driving wheels of a vehicle provided with the transmission of Fig. 1.

Referring to the drawings and with particular reference to Fig. 1 thereof, the transmission designated generally by reference numeral 9 and disclosed in this figure comprises a planetary gear set 10 and a countershaft gear set 11 mounted respectively in a front casing 12 and a rear casing 13. A transmission input or drive shaft 14 designed to be driven in any convenient manner by the engine of the vehicle with which the transmission mechanism is associated, is rotatably mounted in the casing 12 by means of ball bearing elements 15. The transmission also includes a first driven shaft 16, rotatably mounted in the casing 13 by means of ball bearing elements 17 and designed to complete a drive to the rear wheels 16a of the vehicle, and a second driven shaft 18 for driving the front wheels 18a of the vehicle and rotatably mounted in the casing 13 by means of ball bearing elements 19. It is contemplated that the drive connections between shafts 16 and 18 and the respective rear and front wheels 16a and 18a may include any required number of universal joints designated by reference numerals 16b and 18b.

An intermediate shaft 20 is rotatably mounted in the casing members 12 and 13 by means of ball bearing elements 21 and is splined as indicated at 22, to rotate in unison with the drive shaft 14. The intermediate shaft 20 is piloted within the forward end of the driven shaft 16 as indicated at 23 and the shaft 20 is rotatable with respect to the driven shaft 16.

The planetary gear set 10 comprises a sun gear 24 integrally formed on the intermediate shaft 20, a sun gear 25 integrally formed on a short sleeve shaft 26 which is rotatable around the intermediate shaft 20, a ring gear 27, planetary pinions 28 which mesh respectively with the ring gear 27 and with the sun gear 25, planetary pinions 29 which mesh respectively with the sun gear 24 and with the pinions 28, and a planet pinion carrier 30.

An internally toothed brake ring 31, rigidly secured to the frame 12 by means of a plurality of bolts, is provided for holding either the ring gear 27 or the sun gear 25 stationary in order to complete a reverse or a low speed ratio drive through the planetary gear set 10. The ring gear 27 is splined to a short hub 32 rotatable about the short sleeve shaft 26 and slidably splined to the hub 32 is a shiftable collar 33. The collar 33 is provided with external teeth 34 which are slidably engageable with internal teeth 35 formed on the inner periphery of the brake ring 31. When the collar 33 occupies the position shown in Fig. 1 the ring gear 27 is free to rotate, however, when the collar 33 is shifted to the left to its reverse drive position so that the teeth 34 are engaged with the teeth 35 the ring gear 27 is held against rotation.

The sun gear 25 may either be held against rotation in order to establish a reduced forward drive through the gear set 10 or may be directly connected to the drive shaft 14 in order to establish a direct drive through the planetary gear set 10. For this purpose the sleeve shaft 26, to which the sun gear 25 is secured, is provided with a slidable collar 36 splined thereto. The collar 36 is movable from its neutral position shown in Fig. 1 to a first or low speed position wherein externally formed teeth 37 engage the internal teeth 35 on the brake ring 31 in order to hold the sun gear 25 stationary. The collar 36 is also provided with internal teeth 38 and when it is moved to the left to its second speed position the teeth 38 mesh or mate with corresponding external teeth 39 integrally formed on the drive shaft 14. Mounted between the teeth 39 and the shiftable collar 36 is a conventional synchronizer ring 40 having the usual blocker teeth 41 for preventing engagement of the internal teeth 38 with the external teeth 39 until the speed of rotation of the teeth 39 becomes synchronized with the speed of rotation of the collar 36.

The countershaft gear set 11 comprises a pair of input gears 42 and 43 both of which are rotatably mounted on the intermediate shaft 20. The gear 42 is integrally formed on a short sleeve shaft 44 which, in turn, is splined as indicated at 45 to the carrier 30. A countershaft 46 carries a plurality of integrally formed countershaft gears 47, 48 and 49. The gears 47, 48 and 49 mesh respectively with the gears 42, 43, and with a gear 50 integrally formed on the driven shaft 16. The gear 49 also meshes with a gear 51 rotatably mounted on the driven shaft 18. The diameter of the gear 50 is slightly less than the diameter of the gear 51 so that upon rotation of the gear 49 in either direction so as to cause one complete revolution of the gear 50, it will simultaneously cause rotation of the gear 51 in the same direction as that of gear 50 but through slightly less than a full revolution.

Splined and axially fixed to the driven shaft 18 is a hub 52 which forms the inner race of a pair of one-way clutches 53 and 54. The one-way clutch 53 also includes an outer race or hub 55 rotatable around the hub 52 and having external teeth 56. Mounted between the outer race 55 and the hub 52 is a plurality of sprags or grippers 57 which tilt into engagement with each of the races 52 and 55 when the race 55 tends to overrun the race 52 in a forward direction but which tilt so as to disengage the races 55 and 52 when the race 52 tends to overrun the race 55 in a forward direction. The one-way clutch 54 is provided with an outer race 58 rotatable with respect to the hub 52 and having external clutch teeth 59 and is also provided with a plurality of sprags 60 positioned between the two races in a manner such that reverse rotation of the outer race 58 relative to the inner race 52 causes the sprags 60 to effect engagement of the one-way clutch 54 and reverse rotation of the race 52 relative to the outer race 58 causes disengagement of the one-way clutch 54 so that the driven shaft 18 may overrun in a reverse direction.

Means are provided for selectively rendering the one-way clutches 53 and 54 effective to transmit a one-way drive from the gear 51 to the driven shaft 18. This means comprises a shiftable clutch collar 61 having a plurality of internal teeth slidably splined to a plurality of radially outwardly extending teeth 62 carried by the gear 51. The clutch collar 61 has a plurality of internal clutch teeth 63 which may be moved into meshing engagement with either the teeth 56 or the teeth 59. When the collar 61 occupies the position shown in Fig. 1, which comprises its forward speed drive position, the one-way clutch 53 is operably connected between the gear 51 and the driven shaft 18 and is effective to permit the driven shaft 18 to overrun the gear 51 in a forward direction, but to cause the shaft 18 to be driven at the speed of rotation of the gear 51 upon any tendency of the gear 51 to overrun the shaft 18 in a forward direction. Upon movement of the collar 61 to its intermediate or neutral position, neither of the one-way clutches 53 or 54 is effective to transmit a drive to the driven shaft 18. When the collar 61 is moved to its right hand or reverse drive position, the one-way clutch 54 is rendered effective to transmit a reverse drive from the gear 51 to the shaft 18 upon any tendency of the gear 51 to overrun the shaft 18 in a reverse direction and to permit the shaft 18 to overrun the gear 51 in a reverse direction.

Synchronizing clutch means are provided in the countershaft gear set 11 for establishing a pair of high speed forward driving ratios between the drive shaft 14 and the two driven shafts 16 and 18. This synchronizing mechanism, indicated generally by reference numeral 64, comprises a hub 65 splined to and axially fixed with respect to the intermediate shaft 20 and having a shiftable collar 66 slidably splined thereto. The shiftable collar 66 has internal clutch teeth 67 designed to clutchingly engage corresponding external teeth 68 or 69 formed respectively on the sides of the gears 43 and 50 upon the respective movement of the collar 66 to the left and right. Positioned between the collar 66 and the teeth 68 is a synchronizer ring 70 formed with the usual blocker teeth for preventing clutching engagement of the collar 66 with the teeth 68 until the speeds of rotation of the gear 43 and the hub 65 are synchronized. Also carried between the collar 66 and the teeth 69 is a synchronizer ring 71 having the usual blocker teeth for preventing engagement between the collar 66 and the teeth 69 prior to synchronization between the speeds of rotation of the hub 65 and the gear 50.

The transmission mechanism disclosed in Fig. 1 provides four different forward speed driving ratios and a single reverse driving ratio between the drive shaft 14 and the two driven shafts 16 and 18, it being desirable to note at this point that during each driving ratio the driven shaft 16 is driven at a slightly higher speed of rotation than the driven shaft 18 so that in normal operation the transmission mechanism will provide the conventional and desirable two wheel or rear wheel drive, whereas a drive is completed to the front wheels of the vehicle through the driven shaft 18 by means of the one-way clutches 53 and 54 upon slippage of the rear wheels of the vehicle as occurs when the vehicle is traversing through snow, mud or sand, for example. It is of course contemplated that the clutch collar 61 may be positioned in its neutral position during the establishment of any of the driving ratios through the present transmission and upon such positionment of the clutch collar 61 only the rear wheels of the vehicle will comprise the driving wheels.

In the usual operation of the present invention as disclosed in Fig. 1, for all forward speed drives the clutch collar 61 is moved to its left hand or forward drive position so as to render the one-way clutch 53 operative. First or the lowest forward speed drive through the transmission is then established by moving the collar 36 to the right into its first speed position so that the external teeth 37 thereon clutchingly engage the internal teeth 35 on the brake ring 31. The collars 33 and 66 are in their neutral positions as shown in Fig. 1. The sun gear 25 is therefore held stationary and the drive during the low forward speed driving ratio proceeds from the driven shaft 14, through the intermediate shaft 20 and sun gear 24 to the planetary gear set 10. The forward rotation of the sun gear 24, while the sun gear 25 is held stationary, acts through the pinions 28 and 29 to cause a reduced forward drive to the carrier 30. The drive then proceeds from the carrier 30 through the gears 42, 47 and 49 to the two gears 50 and 51 associated respectively with the driven shaft 16 and the driven shaft 18, the driven shaft 16 being driven in unison with the gear 50 and the driven shaft 18 being driven through the one-way clutch 53 upon slippage of the rear wheels of the vehicle. It will be noted that during this low forward speed drive through the transmission speed reduction and torque multiplication take place in both the planetary gear set 10 and in the countershaft gear set 11.

Second forward speed drive through the transmission is established by moving the clutch collar 36 to the left into engagement with the clutch teeth 39, the other clutch collars being positioned in their neutral position as shown in Fig. 1. The sun gear 25 is therefore clutched directly to the drive shaft 14 and inasmuch as the sun gear 24 is also driven at drive shaft speed there is a direct drive through the planetary gear set 10 from the drive shaft 14 to the gear 42. The drive proceeds from the gear 42 to the two gears 50 and 51 in the same manner as traced during low forward speed through the transmission mechanism. It will be noted that during second forward speed drive torque multiplication and speed reduction take place only in the countershaft gear set.

Third forward speed drive through the transmission is established by moving the collar 36 to its neutral position, leaving the collar 33 in its neutral position and moving the collar 66 to its leftward or third speed position. The drive then proceeds from the drive shaft 14 through the intermediate shaft 20 to the hub 65 and gear 43. The gear 43 functions to drive the gear 48 while the gear 49 functions to drive the gears 50 and 51. Since the gear 43 is larger than the gear 42 and the gear 48 is smaller than the gear 47 it will be apparent that the speed reduction and torque multiplication will be less during third speed forward drive than during second and it will also be noted that torque multplication and speed reduction occurs only in the countershaft gear set during third speed drive.

Fourth or direct forward speed drive through the Fig. 1 embodiment of the present transmission is established when the collars 36 and 33 occupy their neutral position and the collar 66 is moved to its right hand position into clutching engagement with the teeth 69. This causes a direct drive to be established from the drive shaft to the driven shaft 16 through the intermediate shaft 20 and clutch teeth 69. The idler gear 49 at this time drives the gear 51 at slightly less than a direct drive.

During reverse drive a rear wheel reverse drive may be established by leaving the collar 61 in its neutral position or the collar 61 may be moved to its right hand position to bring the teeth 63 and 59 into engagement so as to establish reverse drive to the front wheels of the vehicle upon any tendency of the rear wheels of the vehicle to slip. The reverse drive is then established upon movement of the clutch collar 33 to the left to bring the teeth 34 into meshing engagement with the brake teeth 35 so as to hold the ring gear 27 stationary. At this time the drive shaft 14 drives the intermediate shaft 20 which in turn through the intermediary of the planetary gear set 10 causes the gear 42 to be rotated at a reverse underdrive. The reverse underdrive rotation of the gear 42, through the planetary gear set 10 causes both gears 50 and 51 to be driven reversely at an underdrive. Torque multiplication and speed reduction take place during reverse drive in both the planetary gear set 10 and the countershaft gear set 11.

With reference now to the first modification of the invention shown in Fig. 2 and briefly referring to the details of the countershaft gear set 11a it will be noted that this portion of the gearing is substantially identical with the countershaft gearing 11 disclosed in Fig. 1. Therefore further description of the countershaft gearing 11a will not be given.

The operation of the planetary gearing 10a disclosed in Fig. 2, however, is different from the planetary gearing 10 disclosed in Fig. 1 and a description thereof follows. A drive shaft 14a has a sun gear 24a secured thereto which comprises one of the input elements of the planetary gear set 10a, and the planetary gear set also includes a ring gear 27a, a second sun gear 25a, planetary pinions 28a which mesh respectively with the sun gear 24a and with the ring gear 27a, and planetary pinions 29a which mesh respectively with the sun gear 25a and with the pinions 28a. The ring gear 27a is directly connected with the gear 42a in this embodiment and the carrier 30a comprises the reaction element for the planetary gear set 10a. A brake ring 31a is provided with spline teeth 35a with which externally formed spline teeth 72 formed on a shiftable clutch collar 73 are in continuous engagement. The clutch collar 73 is also provided with internal clutch teeth 74 which are meshable with external clutch teeth 75 formed on the carrier 30a. Upon movement of the clutch collar 73 to the right to bring the teeth 74 and 75 into meshing engagement, the carrier 30a is held stationary in order to provide a reverse drive through the transmission.

Combined clutching and braking means are also provided for either connecting the sun gear 25a to the drive shaft 14a or holding this sun gear stationary. This combined clutching and braking means comprises a shiftable collar 36a having internal teeth 38a slidably splined to a hub portion of a sleeve shaft 26a, to which is integrally secured the sun gear 25a. The collar 36a also is provided with external teeth 37a which are adapted to meshingly engage the internal teeth 74 on the collar 73 in order to hold the sun gear 25a stationary to complete a low forward speed drive through the transmission. The internal spline teeth 38a are also adapted to cooperate with external clutch teeth 39a rotatable with the drive shaft 14a. Between the teeth 39a and the teeth 38a is positioned a synchronizer 40a, identical in all respects with the synchronizer 40 shown in Fig. 1, for effecting synchronization between the teeth 39a and the teeth 38a prior to permitting meshing engagement therebetween.

The operation of the modification of the invention disclosed in Fig. 2 is very similar to that disclosed in Fig. 1. Low forward speed drive is established by moving the clutch collar 36a to the right in order to brake the sun gear 25a whereupon a low forward speed power train is established from the drive shaft 14a to the two counteshaft gears 50a and 51a. Torque multiplication and speed reduction occurs in the countershaft gearing 11a and in the planetary gearing 10a during the establishment of this driving ratio.

Second forward speed drive is established through the transmission mechanism disclosed in Fig. 2 by moving the clutch collar 36a to the left so as to establish a direct drive through the planetary gearing 10a. As in the Fig. 1 embodiment of the invention torque multiplication and speed reduction occur only in the countershaft gear set 11a during the establishment of second forward speed drive.

Third and fourth forward speed drives are established by actuating the clutch collar 64a to the left and right respectively in the same manner as these driving ratios are established in the Fig. 1 embodiment of the invention.

Reverse drive is established through the Fig. 2 modification by moving the clutch collar 73 to the right in order to hold the planetary gear carrier 30a stationary. At this time the sun gear 24a, through the gear set 10a, causes the ring gear 27a and the gear 42a connected thereto to be rotated reversely. The countershaft gearing then causes a reverse drive to be transmitted to the two gears 50a and 51a. Torque multiplication and speed reduction takes place in both gear sets as it did in the Fig. 1 embodiment of the invention.

The second modification of the invention disclosed in Fig. 3 differs from the embodiment thereof disclosed in Figs. 1 and 2 in that the plantetary gearing comprises a simple planetary gear set as distinguished from the dual complex planetary gearing disclosed in Figs. 1 and 2 and reverse drive is established by the countershaft gear set. In this embodiment, the drive shaft 14b extends through the planetary gearing and is piloted in the driven shaft 16b.

The planetary gear set 10b comprises a sun gear 76 splined to or integral with the drive shaft 14b, a ring gear 77, planetary pinions 78 meshing respectively with the sun gear 76 and ring gear 77, and a planet pinion carrier 79 for rotatably mounting the pinions 78 and secured to an intermediate sleeve shaft 79b.

A brake ring 31b rigidly secured to the casing 12b is provided for braking the ring gear 77 during both the low forward speed drive and the reverse drive. The brake ring 31b has internal teeth 35b and a shiftable collar 80 is provided with external perpheral teeth 81 slidably engaging the teeth 35b. The collar 80 is slidably journaled on the drive shaft 14b and is also provided with internal brake teeth 82.

The ring gear 77 is connected with a collar 83 having internal peripheral teeth 84. A slidable collar 85 journaled on the drive shaft 14b has external spline teeth 86 for slidably engaging the teeth 84 and has external clutch teeth 87 for engaging the brake teeth 82. The collar 85 is also provided with internal clutch teeth 88 for engaging the external teeth 89 formed on a hub 90 secured to the drive shaft 14b.

The sleeve shaft 79b is provided with two gears 42b and 91. The gear 42b meshes with a gear 47b slidably splined to the countershaft 46b when the gear 47b occupies its neutral position. The gear 47b is slidable to the right, from the position shown in Fig. 3, until it meshes with an idler gear 92 suitably rotatably mounted and in continuous mesh with the gear 91. It will be apparent that upon forward rotation of the gear 91, when the gear 47b is in meshing engagement with the gear 92, that the countershaft 46b will be rotated reversely.

The countershaft gear set 11b is also provided with gears 43b, 48b, 49b, 50b and 51b. A shiftable clutch collar 64b, slidably splined to a hub 65b carried by the drive shaft 14b is effective is provide third and fourth forward speed drives through the transmission in the same manner as the synchronizing clutch member 64 provides the third and fourth speed drives in the Fig. 1 embodiment of the invention.

The gear 51b is adapted to drive the front wheel driven shaft 18b through the medium of a pair of one-way clutches 53b and 54b upon the selective positioning of the clutch collar 61b.

In addition to the third and fourth forward speed drives through the Fig. 3 embodiment of the invention which are provided by the countershaft gearing 11b, this transmission also provides two lower speed forward drives and a reverse drive.

Low forward speed drive is established upon movement of the collar 85 to the left to bring the clutch teeth 87 into mesh with the brake teeth 82 so as to hold the ring gear 77 stationary. At this times the drive proceeds from the drive shaft 14b, through the sun gear 76, through the pinions 78 and carrier 79 to the gear 42b. The drive proceeds from the gear 42b through the gear 47b, countershaft 46b and gear 49b to the two gears 50b and 51b respectively associated with the driven shafts 16b and 18b. Torque multiplication and speed reduction occurs in both the planetary gear set 10b and the countershaft gear set 11b during the establishment of low forward speed drive through the transmission disclosed in Fig. 3.

The second forward speed drive through this transmission is established by moving the clutch collar 85 to the right to bring the teeth 88 into clutching engagement with the teeth 89. This movement of the collar 85 causes the ring gear 77 to be driven at the same speed of rotation as the drive shaft 14b to thereby lock up the planetary gear set 10b to cause the gear 42b to be driven in unison with the drive shaft 14b. The drive then proceeds through the countershaft gear set 11b to the gears 50b and 51b and from them respectively to the driven shafts 16b and 18b in the same manner as the first forward speed drive proceeds through the transmission. During the second forward speed drive through the Fig. 3 embodiment of the invention torque multiplication and speed reduction take place only in the countershaft gear set 11b.

Reverse drive through the Fig. 3 embodiment of the invention is established upon moving the gear 47b into meshing engagement with the gear 92 and at the same time moving the collar 80 to the right to bring its teeth 82 into meshing engagement with the teeth 87 in order to hold the ring gear 77 stationary. As desired, the clutch collar 61b may either be positioned in its neutral or reverse drive position during reverse drive depending upon whether it is desired to have a rear wheel drive only or to have the front wheels of the vehicle drive upon slippage of the rear wheels. During reverse drive the gears 91 and 42b are driven forwardly at the same ratio as they are driven forwardly during the low speed forward drive and the gear 91, driving the gear 47b through the idler gear 92, imparts reverse rotation to the gear 47b so as to drive the two output gears 50b and 51b in a reverse direction. Torque multiplication and speed reduction take place during reverse drive in both the planetary gear set 10b and the countershaft gear set 11b.

The Fig. 4 embodiment of the invention is quite similar to the Fig. 3 embodiment thereof, differing therefrom in that the reaction ring gear of the planetary gear set 10c is stationary at all times, whereby it is necessary to establish the second forward drive through the transmission by connecting the drive shaft 14c directly to the input member of the countershaft gear set 11c. The countershaft gear set 11c is like the countershaft gearing in Fig. 3, employing gears 43c, 48c, 49c, 50c and 51c, the latter two gears being respectively associated with the driven shafts 16c and 18c. The countershaft gear set 11c also utilizes a synchronizer clutch 64c, two overrunning clutches 53c and 54c and a selectively operable clutch 61c for selectively rendering the overrunning clutches operative. The planetary gearing 10c comprises a sun gear 93 directly connected with the drive shaft 14c, a ring gear 94 stationarily secured to the casing 12c and a plurality of planetary pinions 95 meshing respectively with the gun gear 93 and the ring gear 94 and rotatively mounted upon a carrier 96. The carrier 96 rotates in unison with the gear 97 and this gear in turn continuously meshes with an idler gear 98. The gear 97 is provided with external clutch teeth 99 which are designed to be engaged by corresponding internal clutch teeth 100 formed on a shiftable gear member 101 rotatably mounted on the drive shaft 14c. The shiftable gear member 101 meshes with a shiftable gear member 47c and is provided with external clutch teeth 102 slidable into engagement with clutch teeth 103 carried by a flange 104 integrally secured to the drive shaft 14c.

Low forward speed drive through the Fig. 4 embodiment of the invention is established upon movement of the gear 101 to the left to bring the internal clutch teeth 100 into meshing engagement with the external clutch teeth 99. The drive shaft 14c, then causes the planetary gear set 10c to drive the carrier 96 and gear 97 at a forward reduced drive and this drive is transmitted to the gear 101 through the clutch teeth 99 and 100. The drive is transmitted from the gear 101 to the gear 47c and then proceeds through the gear 49c to the two gear members 50c and 51c associated respectively with the driven shafts 16c and 18c. During the low forward speed drive torque multiplication and speed reduction take place in both the planetary gear set 10c and the countershaft gear set 11c.

Second forward speed drive through the Fig. 4 embodiment of the invention is established upon movement of the gear member 101 to the right to bring external clutch teeth 102 into mesh with the clutch teeth 103. The gear 101 is then driven in unison with the drive shaft 14c and the drive proceeds from the gear 101 to the gear members 50c and 51c associated respectively with the driven shafts 16c and 18c in the same manner as the low forward speed drive proceeds through the countershaft gearing. During second forward speed drive through the transmission torque multiplication and speed reduction take place only in the countershaft gear set 11c.

Third and fourth forward speed drives through the Fig. 4 embodiment of the transmission are established by moving the clutch collar 64c respectively to the left and right and these two power trains are established in the same manner as the corresponding power trains are established in the other embodiments of the invention. In the third forward speed drive torque multiplication takes place only in the countershaft gear set 11c and fourth forward speed drive comprises substantially a direct drive to driven shafts 16c and 18c.

In order to condition the Fig. 4 transmission for reverse drive, the member 47c is selectively moved to the left into meshing engagement with the gear member 98. The planetary gear set 10c functions to multiply the torque from the drive shaft 14c and transmitted through the gears 97, 98 and 47c to the gear 49c and from there to the two gear members 50c and 51c associated respectively with the driven shafts 16c and 18c. The idler gear 98 functions during reverse drive to reverse the direction of rotation so as to cause the two gear members 50c and 51c to be rotated reversely. During reverse drive it is contemplated that the clutch collar 61c will be moved either to its neutral position or to its right-hand or reverse position whereby the one-way clutch 54c is rendered operative, the one-way clutch functioning to permit the driven shaft 18c to overrun in a reverse direction and completing a drive to this shaft upon slippage of the rear wheels of the vehicle driven by the driven shaft 16c.

Although four different embodiments of the present invention have been disclosed, it is contemplated that numerous other changes and modifications may be made in the invention without departing from the spirit or scope thereof.

What is claimed is:

1. In a transmission, the combination of a drive shaft; a driven shaft; a planetary gear set including an output element, an input element and a pair of reaction elements; a stationary member; shiftable brake means for selectively connecting said reaction elements with said stationary member to complete either a reduced forward drive or a reverse drive between said drive shaft and said output element; selectively operable clutch means for connecting one of said reaction elements with the drive shaft for completing a direct drive between said drive shaft and said output element; and a countershaft gear set connecting said output element and said driven shaft for reducing and transmitting the drives from said output element to said driven shaft and further including means connected with said planetary gear set input element and effective to provide two additional drives to said driven shaft.

2. In a transmission for a power-driven vehicle, the combination of a drive shaft, a pair of driven shafts, a planetary gear set drivingly connected with said drive shaft and including an output element, selectively operable means for controlling said planetary gear set to selectively complete relatively low and high speed forward drives or a reverse drive between said drive shaft and said output element, an element for driving each of said driven shafts, a countershaft gear set drivingly connected between said output element and the driving elements for each of said driven shafts for reducing and transmitting the drive of said output element to one of said driven shaft driving elements and for slightly further reducing and transmitting the drives from said output element to the other driven shaft driving element, and a pair of overrunning devices between said other driven shaft driving element and its associated driven shaft and effective respectively to transmit forward and reverse drives to and to permit the associated driven shaft to overrun in forward and reverse directions with respect to the other driven shaft input element, whereby the other driven shaft normally overruns and is effective to drive the vehicle upon slippage of the one driven shaft.

3. In a transmission for a power-driven vehicle, the combination of a drive shaft, a pair of driven shafts, a planetary gear set drivingly connected with said drive shaft and including an output element, selectively operable means for controlling said planetary gear set to selectively complete relatively low and high speed forward drives or a reverse drive between said drive shaft and said output element, an element for driving each one of said driven shafts, a countershaft gear set drivingly connected between said output element and the driving elements for each of said driven shafts for reducing and transmitting the drives from said output element to one of said driven shaft driving elements and for slightly further reducing and transmitting the drive from said output element to the other driven shaft driving element, and forward and reverse overrunning devices between said other driven shaft driving element and its associated driven shaft and effective respectively to transmit forward and reverse drives to and to permit the associated driven shafts to overrun in forward and reverse directions with respect to the one driven shaft driving element, whereby the other driven shaft normally overruns and is effective to drive the vehicle upon slippage of the one driven shaft, and a clutching device for selectively rendering one or the other of said overrunning devices operable or rendering both of them inoperable.

4. In a transmission for a power-driven vehicle, the combination of a drive shaft; a pair of driven shafts; an element for driving each of said driven shafts; a planetary gear set having an output element, a pair of reaction elements and an input element connected to said drive shaft; shiftable engaging means for selectively holding one of said reaction elements stationary or connecting it to said drive shaft to respectively provide low and high speed drives between said drive shaft and said output element; selectively operable engaging means for holding the other reaction element stationary to provide a reverse drive between said drive shaft and said output element; gearing for completing and reducing the drive from said output element to the driving elements for said driven shafts; said gearing being effective to complete slightly higher ratio drives to one of said driving elements than to the other driving element; and selectively controlled overrunning one-way engaging means between said other driving element and its associated driven shaft for permitting such shaft to overrun normally and for driving it upon slippage of the one driven shaft.

5. In a transmission for a power-driven vehicle, the combination of a drive shaft; a pair of driven shafts; an element for driving each of said driven shafts; a planetary gear set having an output carrier, reaction sun and ring gears and an input sun gear connected to said drive shaft; shiftable engaging means for selectively holding one of said reaction elements stationary or connecting it to said drive shaft to respectively provide low and high speed forward drives between said drive shaft and said output carrier; a selectively operable brake for holding the reaction ring gear stationary to provide a reverse drive between said drive shaft and said output carrier; gearing for reducing and completing the drive from said output carrier to the driving elements for said driven shafts; said gearing being effective to complete slightly higher ratio drives to one of said driving elements than to the other; and selectively controlled overrunning one-way engaging means between said other driving element and its associated driven shaft for permitting such shaft to overrun normally and for driving it upon slippage of the one driven shaft.

6. In a transmission for a power-driven vehicle, the combination of a drive shaft; a pair of driven shafts; a driving element for each of said driven shafts; a planetary gear set having an output ring gear, a reaction sun gear, a reaction carrier and an input sun gear connected to said drive shaft; shiftable engaging means for selectively holding said reaction sun gear stationary or connecting it to said drive shaft to respectively provide low and high forward speed drives between said drive shaft and said output ring gear; selectively operable braking means for holding the reaction carrier stationary to provide a reverse drive between said drive shaft and said output ring gear; gearing for completing the drive from said output ring gear to the driving elements for said driven shafts; said gearing being effective to complete slightly higher ratio drives one of said driven shaft driving elements than to the other driven shaft driving element; and selectively controlled overrunning one-way engaging means between said other driven shaft driving element and its associated driven shaft for permitting such shaft to overrun normally and for driving it upon slippage of the one driven shaft.

7. In a transmission, the combination of a drive shaft;

a pair of driven shafts; a planetary gear set drivingly connected with said drive shaft and including an input element, an output element and a reaction element; selectively operable engaging means for various of said elements of said planetary gear set for completing a plurality of different drives between said drive shaft and the output element thereof; gearing including a pair of gear members selectively connected with one of said driven shafts and connected to drive the other driven shaft and effective to complete the drive from said output element to the gear members; said gearing also including a selectively operable member for reversing the drives between said output element and said gear members; said gearing being effective to complete slightly higher ratio drives to one of said gear members than to the other; and selectively controlled overrunning one-way engaging means between the other driven shaft and the gear member adapted to drive it for permitting such shaft to overrun normally and for driving it upon slippage of the one driven shaft.

8. In a transmission, the combination of a drive shaft; a pair of driven shafts; a planetary gear set drivingly connected with said drive shaft and including an input element, an output element and a reaction element; selectively operable engaging means for holding the reaction element stationary or connecting it to said drive shaft to complete a plurality of drives between said drive shaft and the output element; gearing including a pair of gear members selectively connected with one of said driven shafts and adapted to drive the other driven shaft and effective to complete the drive from said output element to the gear members; said gearing also including a selectively operable member for reversing the drive from said output element; said gearing being effective to complete slightly higher ratio drives to one of said gear members than to the other; and selectively controlled overrunning one-way engaging means between the other driven shaft and the gear member adapted to drive it for permitting such shaft to overrun normally and for driving it upon slippage of the one driven shaft.

9. In a transmission, the combination of a drive shaft; a pair of driven shafts; a planetary gear set drivingly connected with said drive shaft and including an input sun gear, an output carrier and a reaction ring gear; selectively operable engaging means for holding said ring gear stationary or connecting it to said sun gear for completing respectively relatively low and high speed forward drives between said drive shaft and said carrier; gearing including a pair of gear members respectively associated with one of said driven shafts and adapted to drive the other driven shaft and effective to complete the drive from said carrier to the gear members; said gearing also including a slectively operable member for reversing the drive between said carrier and said gear members; said gearing being effective to complete slightly higher ratio drives to one of said gear members than to the other; and selectively controlled overrunning one-way engaging means between the other driven shaft and the gear member adapted to drive it for permitting such shaft to overrun normally and for driving it upon slippage of the one driven shaft.

10. In a transmission, the combination of a drive shaft; a pair of driven shafts; a planetary gear set drivingly connected with said drive shaft and including an input sun gear, an output carrier and a reaction ring gear; the reaction ring gear being stationary; an output gear element selectively connectible with said carrier or with said drive shaft to provide relatively low and high speed drives between the drive shaft and said output gear element; gearing including a pair of gear members respectively connected with one of said driven shafts and adapted to drive the other driven shaft and effective to complete the drive from said output gear element to the gear members; said gearing also including selectively operable means for reversing the drive; said gearing being effective to complete a slightly higher ratio drive to one of said gear members than to the other; and selectively controlled overrunning one-way engaging means between the other driven shaft and the gear member adapted to drive it for permitting such shaft to overrun normally and for driving it upon slippage of the one driven shaft.

11. In a transmission, the combination of a drive shaft, a pair of driven shafts, countershaft gearing including a pair of input shafts selectively adapted to be driven by said drive shaft, said countershaft gearing comprising a first gear integral with one of said input shafts and a pair of gears selectively connectible to the other of said input shafts, an integral countershaft gear cluster including a plurality of gears adapted to respectively mesh with said first gear and said pair of gears, one of said pair of gears being integrally connected with one of said driven shafts, another gear adapted to mesh with one of said gears of said gear cluster for providing a drive for said other driven shaft of a slightly lower ratio than the drive to said first driven shaft, a pair of one-way engaging devices disposed between said last-named gear and said other driven shaft and selectively operable to provide forward and reverse drives to said other driven shaft except when the latter overruns said one driven shaft, said countershaft gearing being effective to provide three different drives to said driven shafts upon the selective driving of said first gear and said pair of gears by said drive shaft.

12. In a transmission, the combination of a drive shaft, a pair of driven shafts, countershaft gearing including a pair of input shafts, planetary gearing selectively operable for providing ratio drives to one of said input shafts, selectively operable clutch means for providing a direct drive from said drive shaft to said other input shaft, said countershaft gearing comprising a first gear integral with said one of said input shafts and a pair of gears selectively connectible to the other of said input shafts, an integral countershaft gear cluster including a plurality of gears adapted to respectively mesh with said first gear and said pair of gears, one of said pair of gears being integrally connected with one of said driven shafts, another gear adapted to mesh with one of said gears of said gear cluster for providing a drive for said other driven shaft of a slightly lower ratio than the drive to said first driven shaft, a pair of one-way engaging devices disposed between said last-named gear and said other driven shaft and selectively operable to provide forward and reverse drives to said other driven shaft except when the latter overruns said one driven shaft, said countershaft gearing being effective to provide three different drives to said driven shafts upon the selective driving of said first gear by said planetary gear set or said pair of gears by said drive shaft.

References Cited in the file of this patent

UNITED STATES PATENTS

| | | |
|---|---|---|
| 1,256,372 | Rowledge | Feb. 12, 1918 |
| 1,738,212 | Smith | Dec. 3, 1929 |
| 2,072,058 | Rauen | Feb. 23, 1937 |
| 2,107,072 | Herrington | Feb. 1, 1938 |
| 2,215,671 | Swennes | Sept. 24, 1940 |
| 2,229,336 | Neracher | Jan. 21, 1941 |
| 2,277,214 | Dodge | Mar. 24, 1942 |
| 2,348,763 | Syrovy | May 16, 1944 |
| 2,354,300 | Bock | July 25, 1944 |
| 2,584,468 | Kelbel | Feb. 5, 1952 |

OTHER REFERENCES

Automotive Industries, September 1, 1950, pp. 32, 33, 72.